Oct. 13, 1964    J. GUTKOWSKI ETAL    3,152,988
FILTER ELEMENT
Filed June 16, 1959

Inventors
JANUSZ GUTKOWSKI
NICOLAS FLORESCU
by: *Cavanagh & Norman*

United States Patent Office 3,152,988
Patented Oct. 13, 1964

3,152,988
FILTER ELEMENT
Janusz Gutkowski, Toronto, Ontario, and Nicolas Florescu, Scarborough, Ontario, Canada, assignors, by mesne assignments, to New York Business Development Corporation, Albany, N.Y., a corporation of New York
Filed June 16, 1959, Ser. No. 820,690
6 Claims. (Cl. 210—486)

This invention relates to a filter structure comprising novel filter elements joined to form an integral structure in stacked array.

Fluid filters required to meet modern requirements for high speed aircraft service and the like must operate at high internal pressures and may be subjected to abrupt flow reversals of high intensities, substantially all prior art filter structures are not readily adaptable for modern service of this kind. For example, the pressures involved under todays design conditions may be of the order of ten to fifty times greater than the highest pressures encountered in comparable aircraft service prior to the year 1950. In an attempt to provide stronger filter elements some prior designs have utilized the teachings of British Patent 575,727 of April 3, 1944, in which sintered metallic compacts are proposed as rigid porous members useful as a filter element material. It has been the tendency for filter elements of this so-called sintered or equivalent non metallic compact filter element to crumble, crack, or otherwise break down under severe service conditions. Under conditions of flow reversal due to high back pressures which may result during service operations as contrasted with the low pressures required for flow reversal cleaning of the filter, the elements are apt to crack or break down, rendering the entire filter unit inoperative, and therefore a source of imminent danger to the aircraft which it serves. While sintered metallic compact filter elements were originally devolped in order to provide a filter element of sufficient structural strength to be self-supporting druing flow reversal when back flushing the filter unit for cleaning, prior designs of filter element of this class are in no way self-sustaining under conditions of high back pressure which may occur by reason of flow reversal during service operation.

It is therefore the main object of this invention to provide porous filter compacts or elements of inherent structural integrity, including supporting studs or protuberances thereon adapted upon assembly of a plurality of such compacts to provide a through supported structure whereby the same is self-supporting under very high pressure conditions of direct flow and flow reversal.

It is a further object of the invention to provide a filter unit as set forth in which inner and outer margins or edges of individual filter elements or discs are adapted to be secured as by soldering or the like to an adjacent filter disc whereby to constitute an entire structurally integrated filter structure. Other objects of the invention will be appreciated by a study of the following specifications, taken in conjunction with the accompanying drawings.

Figure 1:
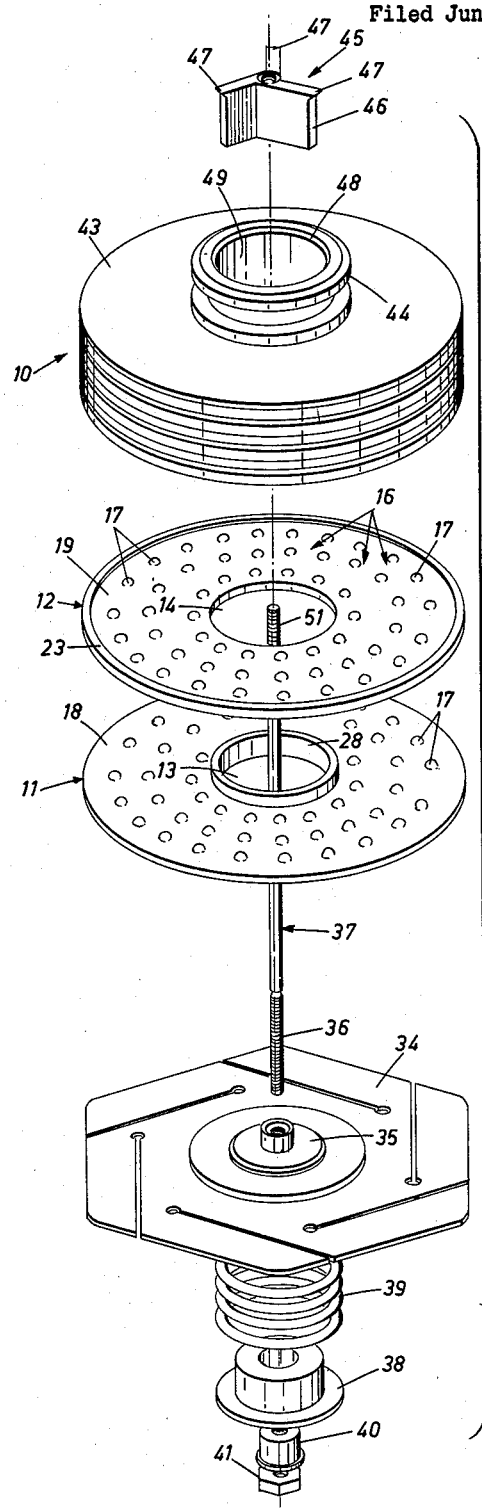
FIGURE 1 is an exploded perspective view of a filter unit structure according to the invention during assembly thereof.
Figure 2:
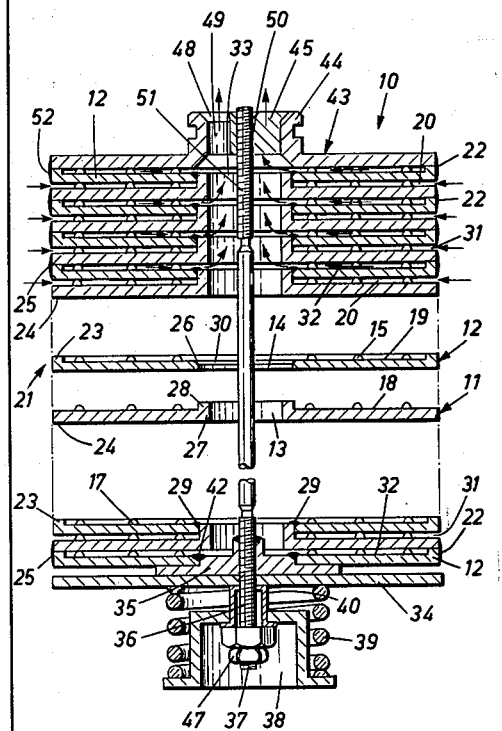
FIGURE 2 is a sectional view of the components of FIGURE 1 in assembled relationship, illustrating the manner of fastening the individual filter elements each to the next.

Referring to the drawings, the filter structure 10 of the invention shown in FIGURE 2 comprises a plurality of porous disc-like members 11 and 12 of structural integrity, each having a similarly located opening 13 and 14 respectively which may be in the form of a central positioned aperture substantially as shown. Each of the disc members is preferably formed of sintered bronze, for example according to the teaching of British Patent 710,838, dated October 10, 1952, and British Patent 575,727, dated April 3, 1944. It is preferred that the porous disc members be formed of sintered bronze of a shape providing spacing means 15 in the form of a substantially uniformly distributed array 16 of protuberances in the form of stud-like members 17 of somewhat hemispherical shape, from at least one surface, such as surface 18, or surface 19, of each of the respective disc members 11 and 12. The stud support members are adapted to engage an adjacent surface of an adjacent disc member for support of the latter in spaced relation therewith, and defining a fluid communicating passage 20 therebetween.

The array of stud support members on the discs is similarly disposed on each so that the support members may be aligned as indicated in FIGURE 2 for structural support by way of aligned studs throughout the complete stack 21 of filter discs 11 and 12. In addition to the rigidity given to the filter elements as well as the stacked unit, the invention provides for additional structural rigidity achieved by the joining of alternate pairs of inner and outer adjacent peripheral edges. Thus the outer pairs of peripheral edges 22 may be joined by providing a lip or flange 23 extending from one of the discs such as the disc element 12 to engage the outer periphery 24 of disc 11. Flange 23 preferably forms an integral part of the disc element 12. The flange 23 is joined to the peripheral edge 24 by solder as at 25, or by welding or other suitable means, thereby to form a rigid joint of each outer pair of peripheral edges 22.

The alternate inner peripheral edges 26 and 27 of discs 12 and 11 respectively are joined by providing an inner ring or flange 28, preferably forming an integral part of the disc 11, and rising through the enlarged opening 14 of disc 12 to permit the formation of a soldered joint as at 29 in the chamfered recess 30 of aperture 14 about the flange 28. By virtue of this alternate arrangement described, alternately arranged outwardly communicating passages 31 and inwardly communicating passages 32 are provided in the filter stack structure in such manner that the outwardly communicating passages 31 are adapted for communication of fluid to the porous disc members for filtered flow through the latter into the inwardly communicating passages 32 and central duct 33 effectively defined by the openings 13 of the porous disc members 11 and their associated inner flanges 28.

The assembly of filter structure in FIGURE 2 is preferably accomplished by providing a supporting base plate 34 having a filter disc-receiving fitting 35 fixed thereto and accommodating threaded portion 36 of the assembly bolt 37. A base support 38, biased by spring 39, is slidably movable on a sleeve part 40 about the assembly screw 37 below the base plate 34 being retained thereon by a suitable locking screw 41. The base fitting 35 is rigidly fastened, such as by soldering at 42, to the lowermost porous disc member or filter element 12. The assembly then continues by placing alternately thereon a disc member 11 and a disc member 12 while effecting soldering of the outer and inner peripheral edges of the assembled discs described in alternate arrangement progressively until the desired stack of filter elements is achieved. The top plate of the filter stack structure or filter unit, generally indicated by numeral 43, comprises a central fitting or flange portion 44 adapted to accommodate the spider legged retaining nut 45 having spider arms 46 embodying clamping projections 47 adapted to engage the outwardly directed chamfer 48 leading outwardly from the bore 49 and the fitting 44. The spider nut 45 embodies thread means 50 which mate with the upper threads 51 of the bolt 37, enabling bolting of the assembly, but permitting fluid flow from the bore 49 of fitting 44 by way of passages defined therein by the spider arms 46. The upper assembly plate 43 is preferably rigidly joined about the outer peripheral edge 52 thereof to the uppermost outwardly flanged disc member 12.

In operation, flow in the direction of the flow arrows indicated, through the filter structure of the invention, may occur at very high pressures by reason of the very small unsupported areas of the porous disc members existing between the supporting studs 17 thereon. As before mentioned, the supporting studs of the various disc members are preferably aligned, thereby to provide a through continuous rigid structure, as will be apparent in FIGURE 2 between the upper and lower ends of the filter structure. The support provided is in no way affected by the direction of fluid flow. For example, the porous disc members are supported in precisely the same fashion if the flow in the structure of FIGURE 2 is reserved from that indicated by the flow arrows in that figure.

It has been established, according to the invention, that for high pressure service, particularly having regard to high peak pressures which may occur under some kinds of back pressure or flow reversal conditions, the distance between the stud-like support means or the distance of a stud-like support member from an adjacent peripheral edge should be less than five times the thickness of the porous disc member. Moreover, a concentration of numbers of stud-support means should be greater toward the central regions of each disc than at the outer margins, in order to provide for a more uniform distribution of clamping pressure by reason of the clamping action of the assembly bolt 37.

It will be apparent that the inner and outer peripheral flanges described may both form a portion of one porous disc member, or may be provided in the form of separate ring members utilized as spacers or the like. Likewise, the protuberant stud spacing means may form a part of one only of two kinds of disc members of the invention, or again may be provided on both surfaces of all disc members without affecting the function, operation or practical design characteristics of the filter unit described herein, it being understood that the particular form of design of filter unit set forth herein has been submitted as a preferred form only, described for purposes of disclosing the various aspects of the invention. It is therefore intended that the present disclosure should not be construed in any limiting sense other than that indicated by the scope of the following claims having regard to the state of the art.

What we claim is:

1. A filter element structure for use in the filtering of fluids at high pressures and being resistant to flow reversal stresses, said structure comprising: a plurality of stacked parallel spaced apart filter element plates formed of sintered metal and having a substantially uniform thickness over the entire area; a central opening formed in each said plate, said openings being in registration with one another and defined by the inner peripheries of their respective plates; spacing means extending from one side of each said plate, the other side thereof being free of said spacing means separating them from one another and providing fluid communicating passages therebetween, said spacing means contacting and supporting the next adjacent said plate at spaced points over substantially its entire surface area to resist filtering stresses in said plates both towards and away from one another; means integrally uniting the outer peripheries of alternate pairs of said plates rigidly bonding and sealing the same therearound to prevent entry of said fluid therebetween and defining a series of united pairs of said plates having outer peripheral openings between any two adjacent united pairs corresponding to the spacing between said members, and means integrally uniting the inner peripheries of said adjacent united pairs of plates defining inner peripheral openings between said united inner peripheries, fluid communication between said outer and inner peripheral openings being effected solely through said plates.

2. A filter element structure for use in the filtering of fluids at high pressures and being resistant to flow reversal stresses, said structure comprising: a plurality of stacked parallel spaced apart filter element plates formed of sintered metal and having a substantially uniform thickness over the entire area; a central opening formed in each said plate, said openings being in registration with one another and defined by the inner peripheries of their respective plates; an array of stud support members extending integrally from one surface of each plate member toward an adjacent plate member, the other surface thereof being free of said stud members for supporting engagement of said plate in spaced relation with an adjacent plate and defining a fluid communicating passage therebetween, said stud members contacting and supporting the next adjacent said plate at spaced points over substantially its entire surface area to resist filtering stresses in said plates both towards and away from one another; means integrally uniting the outer peripheries of alternate pairs of said plates rigidly bonding and sealing the same therearound to prevent entry of said fluid therebetween and defining a series of united pairs of said plates having outer peripheral openings between any two adjacent united pair corresponding to the spacing between said members, and means integrally uniting the inner peripheries of said adjacent united pairs of plates defining inner peripheral openings between said united inner peripheries, fluid communication between said outer and inner peripheral openings being effected solely through said plates.

3. A filter element structure for use in the filtering of fluids at high pressures and being resistant to flow reversal stresses, said structure comprising: a plurality of stacked parallel spaced apart filter element plates formed of sintered metal and having a substantially uniform thickness over the entire area; a central opening formed in each said plate, said openings being in registration with one another and defined by the inner peripheries of their respective plates; a non-uniformly distributed array of stud support members of greater numerical concentration near said inner periphery than said outer periphery, and extending integrally from at least one surface of each plate member toward an adjacent plate member for supporting engagement of said plate in spaced relation with an adjacent plate and defining a fluid communicating passage therebetween, said stud members contacting and supporting the next adjacent said plate at spaced points over substantially its entire surface area to resist filtering stresses in said plates both towards and away from one another; means integrally uniting the outer peripheries of alternate pair of said plates rigidly bonding and sealing the same therearound to prevent entry of said fluid therebetween and defining a series of united pairs of said plates having outer peripheral openings between any two adjacent united pairs corresponding to the spacing between said members, and means integrally uniting the inner peripheries of said adjacent united pairs of plates defining inner peripheral openings between said united inner peripheries, fluid communication between said outer and inner peripheral openings being effected solely through said plates.

4. A filter element structure for use in the filtering of fluids at high pressures and being resistant to flow reversal stresses, said structure comprising: a plurality of stacked parallel spaced apart filter element plates formed of sintered metal and having a substantially uniform thickness over the entire area; a central opening formed in each said plate, said openings being in registration with one another and defined by the inner peripheries of their respective plates; stud members between said plates separating them from one another and providing fluid communicating passages therebetween, said stud members contacting and supporting the next adjacent said plate at spaced points over substantially its entire surface area to resist filtering stresses in said plates both towards and away from one another; and being distributed on said plate members in identical configuration on each, and providing support of each plate member at spaced apart points therein, in any direction a distance less than five times the thickness of the plate member; means integrally uniting the outer peripheries of alternate pairs of said plates rigidly bonding and sealing the same therearound to prevent entry of said fluid therebetween and defining a series of united pairs of said plates having outer peripheral openings between any two adjacent united pairs corresponding to the spacing between said members, and means integrally uniting the inner peripheries of said adjacent united pairs of plates defining inner peripheral openings between said united inner peripheries, fluid communication between said outer and inner peripheral openings being effected solely through said plates.

5. A filter element structure for use in the filtering of fluids at high pressures and being resistant to flow reversal stresses, said structure comprising: a plurality of stacked parallel spaced apart filter element plates formed of sintered metal and having a substantially uniform thickness over the entire area; a central opening formed in each said plate, said openings being in registration with one another and defined by the inner peripheries of their respective plates; support members between said plates separating them from one another and providing fluid communicating passages therebetween, said support members contacting and supporting the next adjacent said plate at spaced points over substantially its entire surface area to resist high pressure filtering stresses in said plates; peripheral joining means extending around alternate outer and inner peripheries of said plates integrally uniting the same to the next adjacent plate occluding the spacing therebetween and preventing passage of fluids therethrough, intermediate peripheries thereof being free of said joining means to define alternate outer and inner peripheral openings between said plates, fluid communication between said outer and inner openings being effected solely through said plates.

6. A filter element structure for use in the filtering of fluids at high pressures and being resistant to flow reversal stresses, said structure comprising: a plurality of stacked parallel spaced apart filter element plates formed of sintered metal and having a substantially uniform thickness over the entire area thereof; the central portion of said plates defining a central opening therethrough, said openings in said plates being in registration with one another; support members projecting from one surface of each said plates to contact and support the adjacent surface of said plates, said support members being in the form of studs with rounded ends and being regularly spaced over the entire area of each said plates and providing fluid communicating passages therebetween; peripheral joining means extending around alternate outer and inner peripheries of said plates, uniting the same to the next adjacent plate and occluding the spacing therebetween, intermediate peripheries thereof being free of said joining means to define alternate outer and inner peripheral openings between said plates, fluid communication between said outer and inner openings being effected solely through said plates.

References Cited in the file of this patent
UNITED STATES PATENTS

| | | |
|---|---|---|
| 2,165,931 | Levy | July 11, 1939 |
| 2,430,078 | Reinsch | Nov. 4, 1947 |
| 2,696,914 | Conley | Dec. 14, 1954 |
| 2,925,367 | Solberg | Feb. 16, 1960 |

FOREIGN PATENTS

| | | |
|---|---|---|
| 724,453 | Great Britain | Feb. 23, 1955 |
| 770,439 | Great Britain | Mar. 20, 1957 |
| 787,870 | Great Britain | Dec. 18, 1957 |